US011162443B2

(12) United States Patent
Mizushima et al.

(10) Patent No.: US 11,162,443 B2
(45) Date of Patent: Nov. 2, 2021

(54) EVAPORATED FUEL PROCESSING DEVICE FOR FORCED INDUCTION INTERNAL COMBUSTION ENGINE AND CONTROL METHOD FOR THE SAME

(71) Applicant: Hitachi Automotive Systems, Ltd., Hitachinaka (JP)

(72) Inventors: Kenji Mizushima, Isesaki (JP); Shinsaku Tsukada, Isesaki (JP); Hiroshi Miyamoto, Isesaki (JP); Shingo Kimura, Isesaki (JP); Ho Tei, Isesaki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/491,281

(22) PCT Filed: Sep. 13, 2018

(86) PCT No.: PCT/JP2018/034023
§ 371 (c)(1),
(2) Date: Sep. 5, 2019

(87) PCT Pub. No.: WO2019/054452
PCT Pub. Date: Mar. 21, 2019

(65) Prior Publication Data
US 2020/0025156 A1 Jan. 23, 2020

(30) Foreign Application Priority Data
Sep. 13, 2017 (JP) .............................. JP2017-175733

(51) Int. Cl.
*F02D 41/00* (2006.01)
*F02M 25/08* (2006.01)

(52) U.S. Cl.
CPC ..... *F02D 41/0042* (2013.01); *F02D 41/0007* (2013.01); *F02D 41/0032* (2013.01);
(Continued)

(58) Field of Classification Search
None
See application file for complete search history.

(56) References Cited

U.S. PATENT DOCUMENTS 9,574,507 B2 * 2/2017 Pursifull ............. F02D 41/0032
9,611,816 B2 * 4/2017 Pursifull ............. F02D 41/26
(Continued)

FOREIGN PATENT DOCUMENTS

JP 2013-245568 A 12/2013
JP 2016-176390 A 10/2016
(Continued)

OTHER PUBLICATIONS

International Search Report (PCT/ISA/210) issued in PCT Application No. PCT/JP2018/034023 dated Dec. 4, 2018 with English translation (five (5) pages).
(Continued)

*Primary Examiner* — Kevin R Steckbauer
(74) *Attorney, Agent, or Firm* — Crowell & Moring LLP

(57) ABSTRACT

An evaporated fuel processing device for a forced induction internal combustion engine according to the present invention includes: a first purge path extending from the downstream of a purge control valve to an intake pipe at the downstream of a throttle valve; and a second purge path extending from the downstream of the purge control valve to an ejector provided in a reflux pipe providing communication between the intake pipe at the downstream of a compressor and the intake pipe at the upstream of the compressor. The evaporated fuel processing device switches first control characteristic data for the first purge path and second control characteristic data for the second purge path, when the first purge path and the second purge path are switched.

1 Claim, 9 Drawing Sheets

(52) U.S. Cl.
CPC ..... *F02D 41/0035* (2013.01); *F02D 41/0037* (2013.01); *F02D 41/0045* (2013.01); *F02M 25/0836* (2013.01)

(56) References Cited

U.S. PATENT DOCUMENTS

| | | | | |
|---|---|---|---|---|
| 9,651,003 | B2* | 5/2017 | Ulrey | F02B 37/164 |
| 9,797,322 | B2* | 10/2017 | Pursifull | F02B 37/16 |
| 9,822,718 | B2* | 11/2017 | Pursifull | F02D 41/0007 |
| 10,006,387 | B2* | 6/2018 | Pursifull | F02D 41/0032 |
| 10,107,233 | B2* | 10/2018 | Dudar | F02M 25/089 |
| 10,221,784 | B2* | 3/2019 | Pursifull | F02D 41/0042 |
| 10,480,430 | B2* | 11/2019 | Tsutsumi | F02M 35/1038 |
| 2015/0292421 | A1* | 10/2015 | Pursifull | F02D 41/004 123/518 |
| 2015/0369184 | A1 | 12/2015 | Bucknell et al. | |
| 2016/0131055 | A1* | 5/2016 | Jeffrey | F02D 41/0045 123/478 |
| 2016/0201613 | A1* | 7/2016 | Ulrey | F02D 41/0032 123/520 |
| 2016/0201615 | A1* | 7/2016 | Pursifull | F02D 41/0032 123/520 |
| 2016/0305352 | A1* | 10/2016 | Pursifull | F02D 41/004 |
| 2016/0369721 | A1* | 12/2016 | Pursifull | F02D 41/004 |
| 2017/0159585 | A1* | 6/2017 | Pursifull | F02D 41/0007 |
| 2017/0226939 | A1 | 8/2017 | Akita | |
| 2018/0045128 | A1* | 2/2018 | Pursifull | F02D 41/0042 |
| 2018/0156162 | A1* | 6/2018 | Dudar | F02D 41/0045 |
| 2020/0109674 | A1* | 4/2020 | Lee | F02D 41/0007 |
| 2020/0141359 | A1* | 5/2020 | Nakagawa | F02M 25/0836 |

FOREIGN PATENT DOCUMENTS

| | | | | |
|---|---|---|---|---|
| JP | 2017-25756 | A | | 2/2017 |
| JP | 2017-31878 | A | | 2/2017 |
| JP | 2017-31936 | A | | 2/2017 |
| JP | 2017031936 | A | * | 2/2017 ............ F02D 23/00 |
| JP | 2017-137818 | A | | 8/2017 |

OTHER PUBLICATIONS

Japanese-language Written Opinion (PCT/ISA/237) issued in PCT Application No. PCT/JP2018/034023 dated Dec. 4, 2018 (four (4) pages).

Japanese-language Office Action issued in Japanese Application No. 2017-175733 dated May 26, 2020 with English translation (five (5) pages).

Japanese-language Office Action issued in Japanese Application No. 2017-175733 dated Dec. 8, 2020 with partial English translation (5 pages).

* cited by examiner

EVAPORATED FUEL PROCESSING DEVICE FOR FORCED INDUCTION INTERNAL COMBUSTION ENGINE AND CONTROL METHOD FOR THE SAME

TECHNICAL FIELD

The present invention relates to evaporated fuel processing devices for forced induction internal combustion engines, and relates to control methods therefor. More specifically, the present invention relates to evaporated fuel processing devices having a path through which evaporated fuel in a canister is purged into an intake pipe upstream of a compressor by an ejector that generates a negative pressure using a flow of compressed air, and relates to control methods therefor.

BACKGROUND ART

Patent Document 1 discloses an evaporated fuel processing device including: an evaporated fuel passage connecting a canister and an intake passage at the upstream of a compressor of a forced induction device; and an ejector that is provided in the evaporated fuel passage and that purges evaporated fuel from the canister, using a differential pressure between the upstream and the downstream of the compressor.

REFERENCE DOCUMENT LIST

Patent Document

Patent Document 1: JP 2016-176390 A

SUMMARY OF THE INVENTION

Problem to be Solved by the Invention

In a case in which an evaporated fuel processing device is provided with a first purge path through which evaporated fuel in a canister is purged into an intake pipe at the downstream of a throttle valve, and a second purge path through which evaporated fuel in the canister is purged into the intake pipe at the upstream of a compressor by an ejector that generates a negative pressure using a flow of compressed air, there is a possibility of deterioration in drivability and exhaust gas properties of the internal combustion engine, if the purge flow rate is not accurately controlled, whichever path is used to purge the evaporated fuel.

The present invention has been made in view of such conventional circumstances. An object of the present invention is to provide an evaporated fuel processing device for a forced induction internal combustion engine and a control method therefor, capable of controlling the purge flow rate with high accuracy whether a first or second purge path is used to purge evaporated fuel.

Means for Solving the Problem

According to an aspect of the present invention, a control unit switches control characteristic data between first control characteristic data for the first purge path and second control characteristic data for the second purge path, when the first purge path and the second purge path are switched.

Effects of the Invention

According to the present invention, it is possible to control the purge flow rate at high accuracy whether the first or second purge path is used to purge the evaporated fuel, and thus, it is possible to suppress the deterioration in the drivability and the exhaust gas properties of the internal combustion engine even when the purge paths are switched.

MODE FOR CARRYING OUT THE INVENTION

Hereinbelow, embodiments of an evaporated fuel processing device for a forced induction internal combustion engine and a control method therefor, according to the present invention, will be described with reference to the accompanying drawings.

Figure 1:
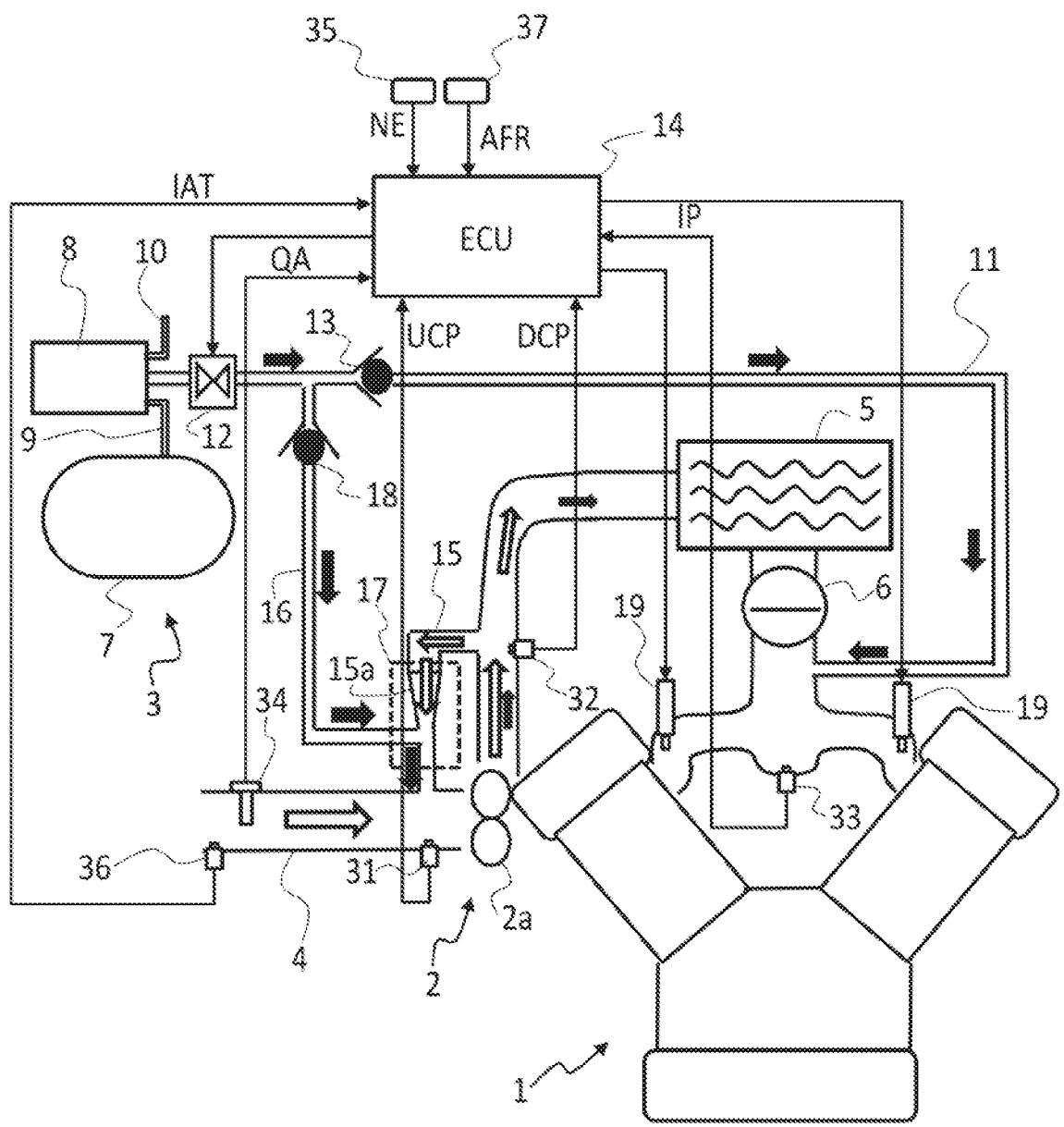
FIG. 1 is a system configuration view of an internal combustion engine according to an embodiment of the present invention.

FIG. 1 is a view illustrating an aspect of the forced induction internal combustion engine provided with the evaporated fuel processing device.

An internal combustion engine 1 illustrated in FIG. 1 includes a turbocharger 2 serving as a forced induction device, and an evaporated fuel processing device 3. Internal combustion engine 1 is mounted on a vehicle.

In an intake pipe 4 of internal combustion engine 1, a compressor 2a of turbocharger 2, an intercooler 5, and a throttle valve 6 are provided in this order from the upstream.

Turbocharger 2 is composed of compressor 2a and a turbine (not shown). Exhaust gas flowing through an exhaust pipe rotates the turbine, to rotate compressor 2a connected to the turbine via a common shaft, so that compressor 2a compresses an intake air flowing through intake pipe 4 and supplies the compressed air to internal combustion engine 1.

Turbocharger 2 is an example of the forced induction device. Internal combustion engine 1 may be provided with a supercharger, which is a forced induction device that drives a compressor by a power supplied by a crankshaft.

Intercooler 5 cools the intake air compressed by compressor 2a, that is, the compressed air.

Throttle valve 6 adjusts an intake air amount drawn into internal combustion engine 1 by adjusting the opening area of intake pipe 4.

Evaporated fuel processing device 3 purges an evaporated fuel generated in a fuel tank 7 into intake pipe 4 of internal combustion engine 1.

A canister 8 is a device in which an adsorbent, such as activated carbon, capable of adsorbing and desorbing the evaporated fuel is filled in a case.

Canister 8 and fuel tank 7 communicate through an evaporated fuel pipe 9. The evaporated fuel generated in fuel tank 7 reaches canister 8 through evaporated fuel pipe 9, and is adsorbed to the adsorbent of canister 8.

Canister 8 is open to the atmosphere via an atmosphere through pipe 10.

Furthermore, canister 8 is connected to intake pipe 4 at the downstream of throttle valve 6 through a first purge pipe 11.

First purge pipe 11 is provided with a purge control valve 12 and a first check valve 13, in this order, from canister 8.

Purge control valve 12 is a solenoid valve, the opening degree of which is controlled by an electrical signal output from an electronic control unit 14.

Electronic control unit 14 includes a microcomputer provided with a CPU, a ROM, a RAM, and the like. For example, electronic control unit 14 controls energization of purge control valve 12 by PWM control, to control the opening degree of purge control valve 12, so as to adjust the purge flow rate.

First check valve 13 is a mechanical valve that opens and closes based on a differential pressure between the upstream and the downstream of first check valve 13. First check valve 13 opens when intake pipe pressure IP, which is the pressure in intake pipe 4 at the downstream of throttle valve 6, becomes negative, and the suction force is applied to the valve body.

First purge pipe 11 provided with first check valve 13 constitutes a first purge path 21. That is, first purge path 21 extends from the downstream of purge control valve 12 to intake pipe 4 at the downstream of throttle valve 6, and uses the negative pressure in intake pipe 4 at the downstream of throttle valve 6 to purge the evaporated fuel from canister 8.

Furthermore, there is provided a reflux pipe 15 that provides communication between intake pipe 4 at the downstream of compressor 2a and intake pipe 4 at the upstream of compressor 2a.

A nozzle portion 15a is provided in the middle of reflux pipe 15. Reflux pipe 15 located downstream of nozzle portion 15a, and first purge pipe 11 located between purge control valve 12 and first check valve 13, communicate through a second purge pipe 16.

The inner diameter of nozzle portion 15a gradually decreases toward the upstream of compressor 2a. This accelerates the compressed air flowing from intake pipe 4 at the downstream of compressor 2a to intake pipe 4 at the upstream of compressor 2a.

Then, a negative static pressure is generated in second purge pipe 16 by the flow of high-speed air injected from nozzle portion 15a, and an air in second purge pipe 16 is drawn into the flow of the compressed air by the static pressure. Then, the compressed air and the air in second purge pipe 16 are discharged at the upstream of compressor 2a.

That is, an ejector 17 is constituted by nozzle portion 15a and second purge pipe 16 communicating to the downstream of nozzle portion 15a. The evaporated fuel is purged from canister 8 by the negative pressure generated by ejector 17.

A second check valve 18 is provided in the middle of second purge pipe 16.

Similarly to first check valve 13, second check valve 18 is a mechanical valve that opens and closes based on a differential pressure between the upstream and the downstream of second check valve 18. Second check valve 18 opens when the pressure generated by ejector 17 becomes negative, and the suction force is applied to the valve body.

Second purge pipe 16 provided with second check valve 18, and ejector 17 of reflux pipe 15 constitute a second purge path 22.

That is, second purge path 22 extends from the downstream of purge control valve 12 to ejector 17 provided in reflux pipe 15 that provides communication between intake pipe 4 at the downstream of compressor 2a and intake pipe 4 at the upstream of compressor 2a. Second purge path 22 uses the negative pressure generated by ejector 17 to purge the evaporated fuel from canister 8.

The evaporated fuel adsorbed to the adsorbent of canister 8 is desorbed from the adsorbent into the air, which is introduced into canister 8 through atmosphere through pipe 10, by the intake pipe negative pressure or the negative pressure generated by ejector 17, and then, the desorbed evaporated fuel is purged to intake pipe 4 through first purge path 21 or second purge path 22.

That is, when first check valve 13 is open, the evaporated fuel adsorbed to the adsorbent of canister 8 is purged into intake pipe 4 at the downstream of throttle valve 6 through first purge path 21, whereas when second check valve 18 is open, the evaporated fuel adsorbed to the adsorbent of canister 8 is purged into intake pipe 4 at the upstream of compressor 2a through second purge path 22.

Here, intake pipe pressure IP, which is the pressure in intake pipe 4 at the downstream of throttle valve 6, increases as the load of internal combustion engine 1 increases, and switches from a negative pressure to a positive pressure. On the other hand, ejector 17 generates a greater negative pressure as the load of internal combustion engine 1, that is, the boost pressure, increases.

In evaporated fuel processing device 3, first check valve 13 opens and second check valve 18 closes, when the suction force acting on first check valve 13 is greater than the suction force acting on second check valve 18, in other words, when intake pipe pressure IP is less than the pressure generated by ejector 17. On the other hand, first check valve 13 closes and second check valve 18 opens, when the suction force acting on second check valve 18 is greater than the suction force acting on first check valve 13, in other words, when the pressure generated by ejector 17 is less than intake pipe pressure IP.

Thus, in evaporated fuel processing device 3, in response to an increase in load of internal combustion engine 1, the state in which the evaporated fuel is purged through first purge path 21 is switched to the state in which the evaporated fuel is purged through second purge path 22.

Figure 2:
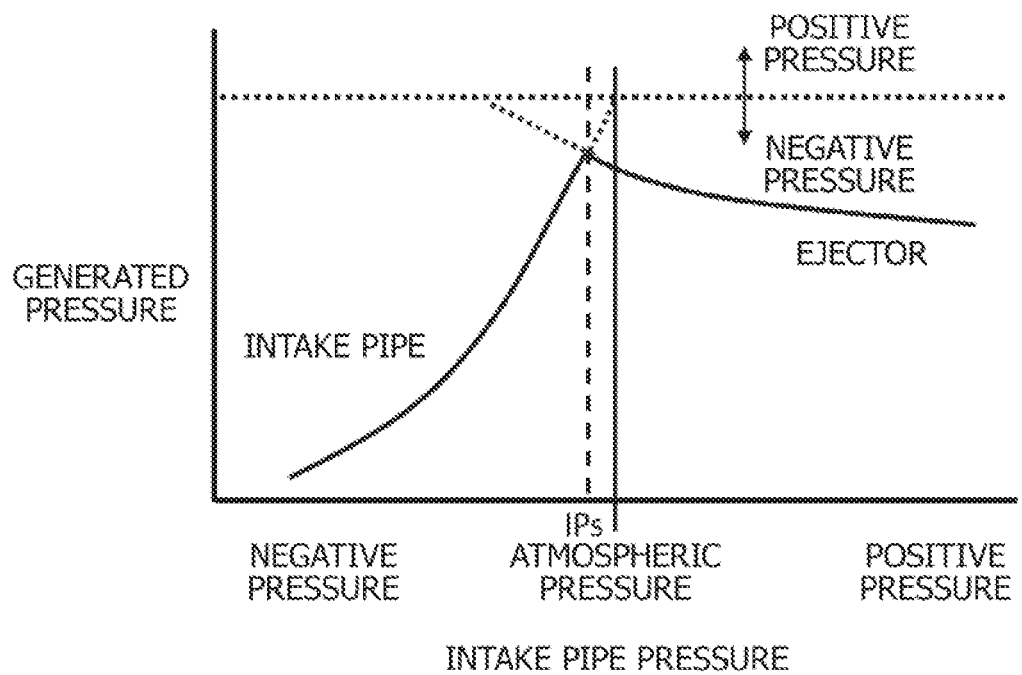
FIG. 2 is a diagram illustrating the relationship between an intake pipe pressure and a pressure generated by an ejector, according to the embodiment of the present invention.

FIG. 2 is a diagram illustrating the relationship between pressure ENP generated by ejector 17 and intake pipe pressure IP at the downstream of throttle valve 6.

Ejector 17 generates a negative pressure before intake pipe pressure IP at the downstream of throttle valve 6 reaches the atmospheric pressure, and generates a greater negative pressure as intake pipe pressure IP at the downstream of throttle valve 6 increases.

Thus, there is a point at which intake pipe pressure IP at the downstream of throttle valve 6 and pressure ENP generated by ejector 17 are the same. When intake pipe pressure IP is less than this coincidence point IPs (IPs<0), first check valve 13 opens and second check valve 18 closes, whereas when intake pipe pressure IP is greater than coincidence point IPs, first check valve 13 closes and second check valve 18 opens.

Figure 3:
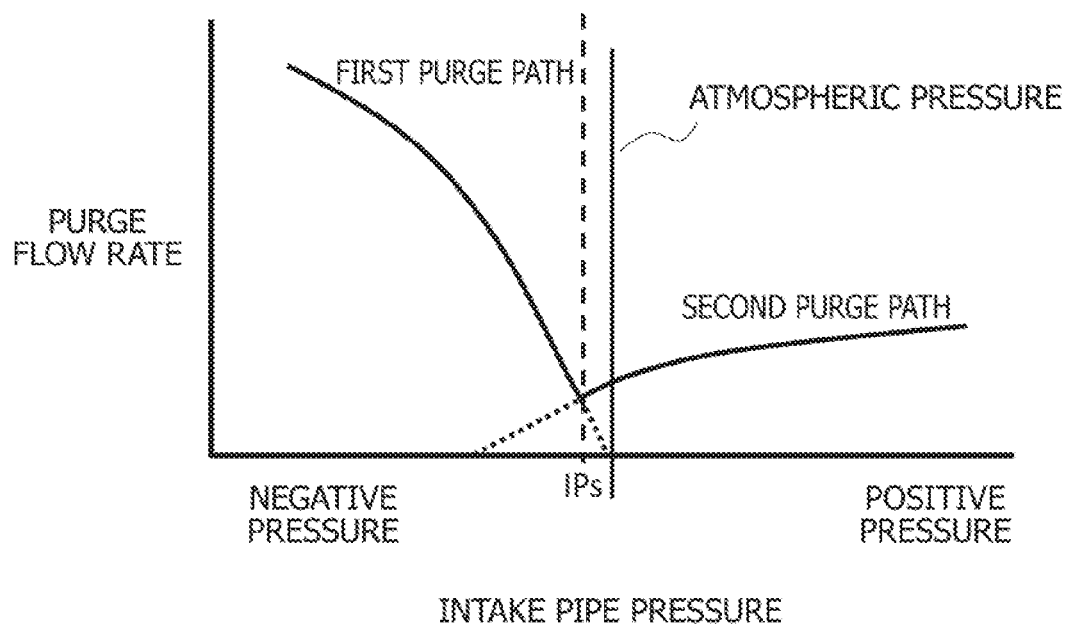
FIG. 3 is a diagram illustrating the relationship between the intake pipe pressure and a purge flow rate, according to the embodiment of the present invention.

FIG. 3 illustrates the relationship between intake pipe pressure IP at the downstream of throttle valve 6 and the purge flow rate in each of purge paths 21 and 22.

In first purge path 21 through which the evaporated fuel is purged using the negative pressure at the downstream of throttle valve 6, the purge flow rate decreases as intake pipe pressure IP at the downstream of throttle valve 6 increases and approaches IPs, which is a pressure at which the purge paths are switched.

When intake pipe pressure IP at the downstream of throttle valve 6 increases and reaches IPs, first check valve 13 closes and second check valve 18 opens. This makes the purge through first purge path 21 shut off, and makes the evaporated fuel purged through second purge path 22 instead of first purge path 21.

The purge flow rate of second purge path 22 increases, as intake pipe pressure IP increases from IPs, that is, as the pressure generated by ejector 17 increases due to an increase in amount of compressed air refluxing through reflux pipe 15 caused by an increase in boost pressure.

Electronic control unit 14 controls the opening degree of purge control valve 12 and the fuel injection amount of a fuel injection valve 19, based on measurement signals of various sensors that sense operating conditions of internal combustion engine 1.

As the various sensors, internal combustion engine 1 includes a first pressure sensor 31 that measures pressure UCP in intake pipe 4 at the upstream of compressor 2a, a second pressure sensor 32 that measures pressure DCP in intake pipe 4 at the downstream of compressor 2a, a third pressure sensor 33 that measures intake pipe pressure IP, which is a pressure in intake pipe 4 at the downstream of the throttle valve 6, an air flow sensor 34 that measures intake air amount QA of internal combustion engine 1, a rotation sensor 35 that measures rotational speed NE of internal combustion engine 1, an intake air temperature sensor 36 that measures intake air temperature IAT of internal combustion engine 1, and an air-fuel ratio sensor 37 that measures air-fuel ratio AFR of internal combustion engine 1 based on an oxygen concentration in the exhaust gas of internal combustion engine 1.

Here, electronic control unit 14 compares air-fuel ratio AFR measured by air-fuel ratio sensor 37 and a target air-fuel ratio, and calculates air-fuel ratio correction factor AFHOS for correcting the fuel injection amount of fuel injection valve 19 so that air-fuel ratio AFR measured by air-fuel ratio sensor 37 approaches the target air-fuel ratio.

Then, as the purge control, electronic control unit 14 calculates an estimated value of the evaporated fuel concentration based on air-fuel ratio correction factor AFHOS, sets a control purge ratio based on the estimated value of the evaporated fuel concentration, etc., and calculates a drive duty cycle in PWM control of purge control valve 12 based on a control purge ratio and a maximum purge ratio, which is a purge ratio in the fully open state of purge control valve 12.

Figure 4:
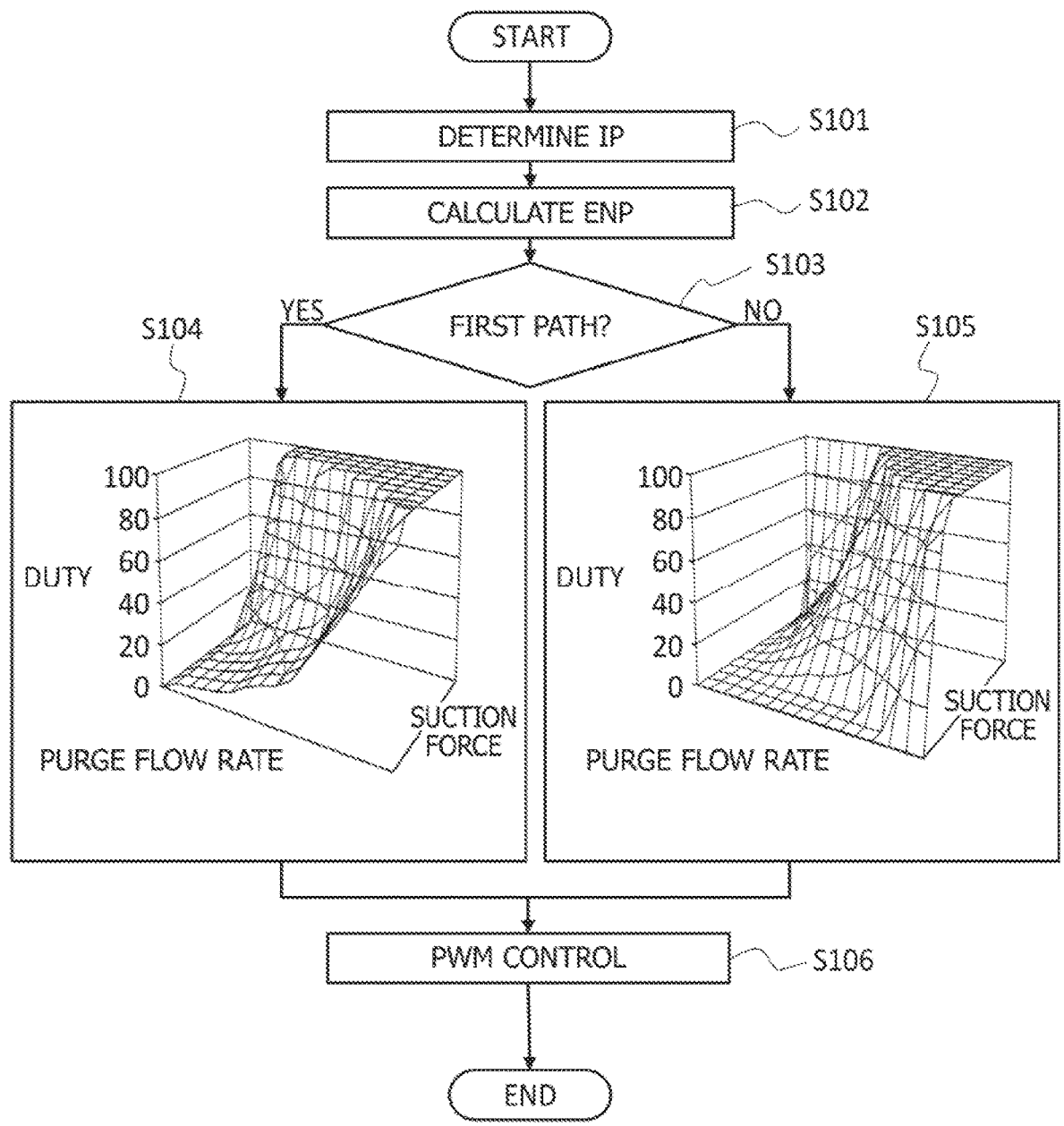
FIG. 4 is a flowchart showing drive control of a purge control value, according to an embodiment of the present invention.

A flowchart of FIG. 4 shows a control process of purge control valve 12 performed by electronic control unit 14.

The control process shown in the flowchart of FIG. 4 includes a processing step of comparing the suction forces of the purge paths to determine which of first purge path 21 and second purge path 22 is used for purging, and a processing step of switching control characteristic data for use in the control of purge control valve 12 between first control characteristic data suitable for first purge path 21 and second control characteristic data suitable for second purge path 22, based on the determined purge path.

In step S101, electronic control unit 14 calculates intake pipe pressure IP at the downstream of throttle valve 6 based on the measurement signal of third pressure sensor 33.

In step S102, electronic control unit 14 calculates pressure ENP generated by ejector 17.

Electronic control unit 14 calculates pressure UCP in intake pipe 4 at the upstream of compressor 2a based on the measurement signal of first pressure sensor 31, and calculates pressure DCP in intake pipe 4 at the downstream of compressor 2a based on the measurement signal of second pressure sensor 32.

Then, electronic control unit 14 calculates pressure ENP generated by ejector 17, based on a difference between pressure UCP in intake pipe 4 at the upstream of compressor 2a and pressure DCP in intake pipe 4 at the downstream of compressor 2a, that is, a differential pressure between the upstream and the downstream of compressor 2a.

Furthermore, electronic control unit 14 estimates pressure DCP in intake pipe 4 at the downstream of compressor 2a based on the load and the rotational speed of internal combustion engine 1, intake air temperature TAT, and the like, and sets an estimated value or a measured value of the atmospheric pressure to be pressure UCP in intake pipe 4 at the upstream of compressor 2a, to obtain pressure ENP generated by ejector 17 based on these pressure values.

Next, in step S103, electronic control unit 14 determines whether the purge is performed through first purge path 21.

In step S103, electronic control unit 14 compares intake pipe pressure IP at the downstream of throttle valve 6 and pressure ENP generated by ejector 17.

Then, if pressure ENP generated by ejector 17 is less than or equal to pressure IP in intake pipe 4 at the downstream of throttle valve 6, electronic control unit 14 determines that the purge is performed through second purge path 22, whereas if intake pipe pressure IP at the downstream of throttle valve 6 is less than pressure ENP generated by ejector 17, electronic control unit 14 determines that the purge is performed through first purge path 21.

When the purge is performed through first purge path 21, the process proceeds to step S104, in which electronic control unit 14 selects the control characteristic data, which is stored for first purge path 21, as the control characteristic data for use in the control of purge control valve 12.

The control characteristic data for first purge path 21 is suitable for a state in which the purge is performed through first purge path 21, that is, a state in which the suction force generated by intake pipe pressure IP at the downstream of throttle valve 6 acts on canister 8 to purge the evaporated fuel. The control characteristic data for first purge path 21 is adapted in advance by experiments and simulations, and is stored in a memory of electronic control unit 14.

On the other hand, when the purge is performed through second purge path 22, the process proceeds to step S105, in which electronic control unit 14 selects the control characteristic data stored for second purge path 22, as the control characteristic data for use in the control of purge control valve 12.

The control characteristic data for second purge path 22 is suitable for a state in which the purge is performed through second purge path 22, that is, a state in which the suction force generated by pressure ENP generated by ejector 17 acts on canister 8 to purge the evaporated fuel. The control characteristic data for second purge path 22 is adapted in advance by experiments and simulations, and is stored in a memory of electronic control unit 14.

After selecting the control characteristic data in step S104 or step S105, the process proceeds to step S106, in which electronic control unit 14 calculates the drive duty cycle using the selected control characteristic data, and controls purge control valve 12 by PWM control using the calculated drive duty cycle.

For example, the abovementioned control characteristic data shows the relationship between the operating conditions, such as the purge flow rate and the suction negative pressure, and the drive duty cycle, as shown in FIG. 4.

In other words, the control characteristic data includes a conversion characteristic for converting information on a purge condition into an opening degree command of purge control valve 12.

Furthermore, for example, the control characteristic data includes: data showing a characteristic for obtaining the duty cycle of negated component based on a differential pressure between the atmospheric pressure and the suction negative pressure, and the battery voltage, which is the power supply voltage; data showing a characteristic for obtaining a maximum purge flow rate based on a differential pressure between the atmospheric pressure and the suction negative pressure, and the engine rotational speed; a factor used to obtain the estimated value of the evaporated fuel concentration from air-fuel ratio correction factor AFHOS; and a factor used to obtain the fuel correction amount from the estimated value of the evaporated fuel concentration.

Each factor used as the abovementioned control characteristic data includes switching between filters in accordance with the purge paths.

That is, control characteristic data having an appropriate value that varies depending on whether the purge is performed through first purge path 21 or through second purge path 22, is selected in steps S104 and S105.

Since electronic control unit 14 switches between control characteristic data appropriate for a case in which the purge is performed through first purge path 21 and that appropriate for a case in which the purge is performed through second purge path 22, it is possible to control the purge flow rate at high accuracy whichever path is used for purging, and it is possible to suppress the deterioration in the drivability and the exhaust gas properties of internal combustion engine 1, which might be caused by switching the purge paths.

In addition to the switching process of the control characteristic data performed based on the purge paths, electronic control unit 14 may perform fuel amount increasing correction to prevent the air-fuel ratio from becoming leaner due to a temporary interruption of the inflow of evaporated fuel into the cylinder at the time of switching the purge paths.

Figure 5:
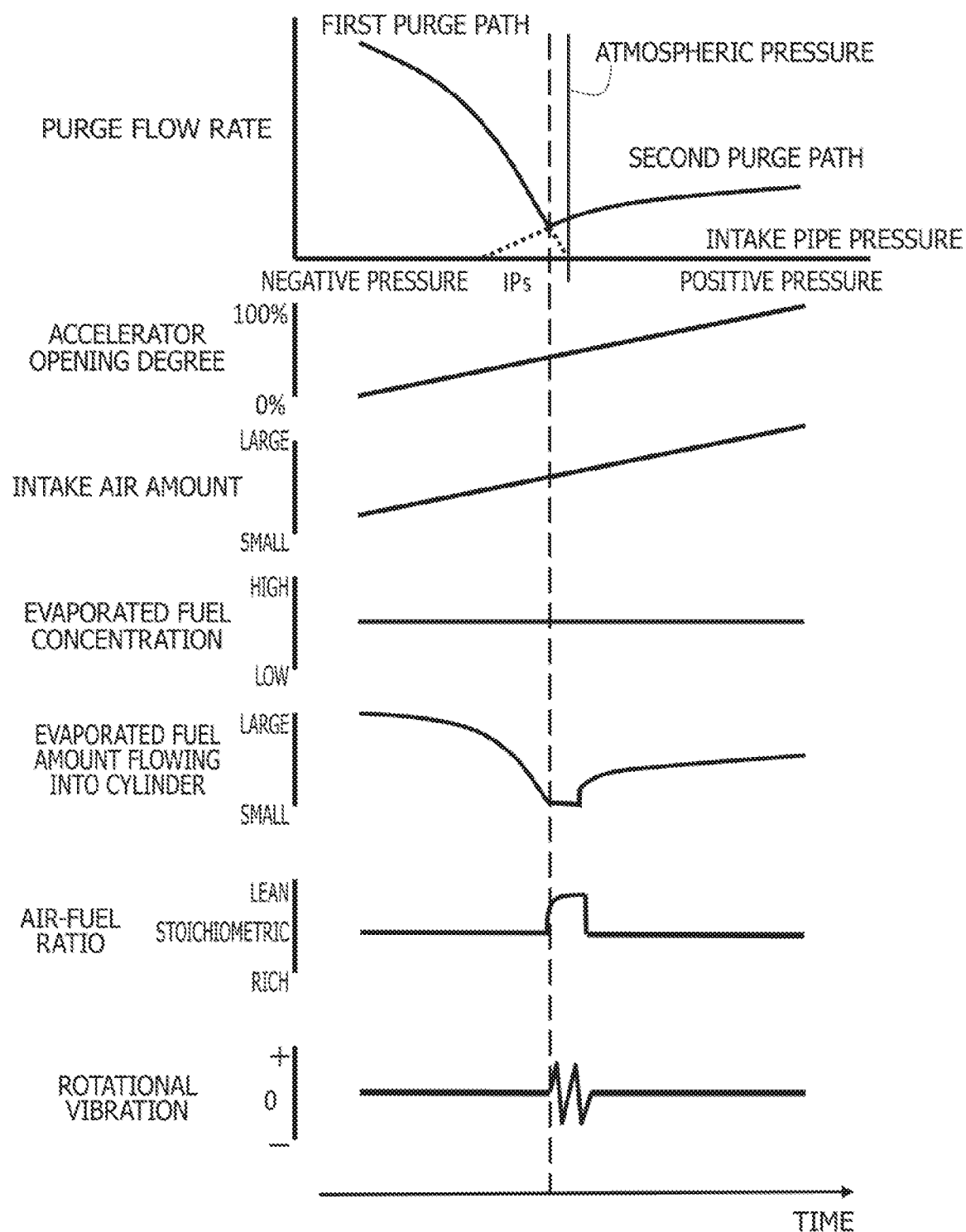
FIG. 5 is a timing diagram for explaining a change in air-fuel ratio that is caused when purge paths are switched, according to the embodiment of the present invention.

The timing diagram of FIG. 5 is a diagram for explaining that the air-fuel ratio fluctuates when the purge paths are switched.

In FIG. 5, when intake pipe pressure IP at the downstream of throttle valve 6 increases in response to the increase in accelerator opening degree, and intake pipe pressure IP reaches or exceeds IPs, first check valve 13 closes and second check valve 18 opens, instead of first check valve 13, so that first purge path 21 is switched to second purge path 22.

At the time of switching between the purge paths performed in this way, a delay may occur before the evaporated fuel flows through the purge path after switching and flows into the cylinder of internal combustion engine 1, so that the air-fuel ratio may be leaner transiently during the delay period. Such a leaner air-fuel ratio may cause rotational vibrations of internal combustion engine 1.

Thus, in order to prevent the air-fuel ratio from being leaner, electronic control unit 14 corrects the fuel injection amount of fuel injection valve 19 to increase the fuel injection amount, when the inflow of the evaporated fuel into the cylinder is temporarily interrupted due to the switching of the purge paths.

FIG. 5 illustrates air-fuel ratio fluctuation occurring during acceleration of internal combustion engine 1 in which first purge path 21 is switched to second purge path 22; however, also during deceleration of internal combustion engine 1 in which second purge path 22 is switched to first purge path 21, the air-fuel ratio becomes leaner in a delay period until the evaporated fuel flows through switched first purge path 21 and flows into the cylinder of internal combustion engine 1.

Figure 6:
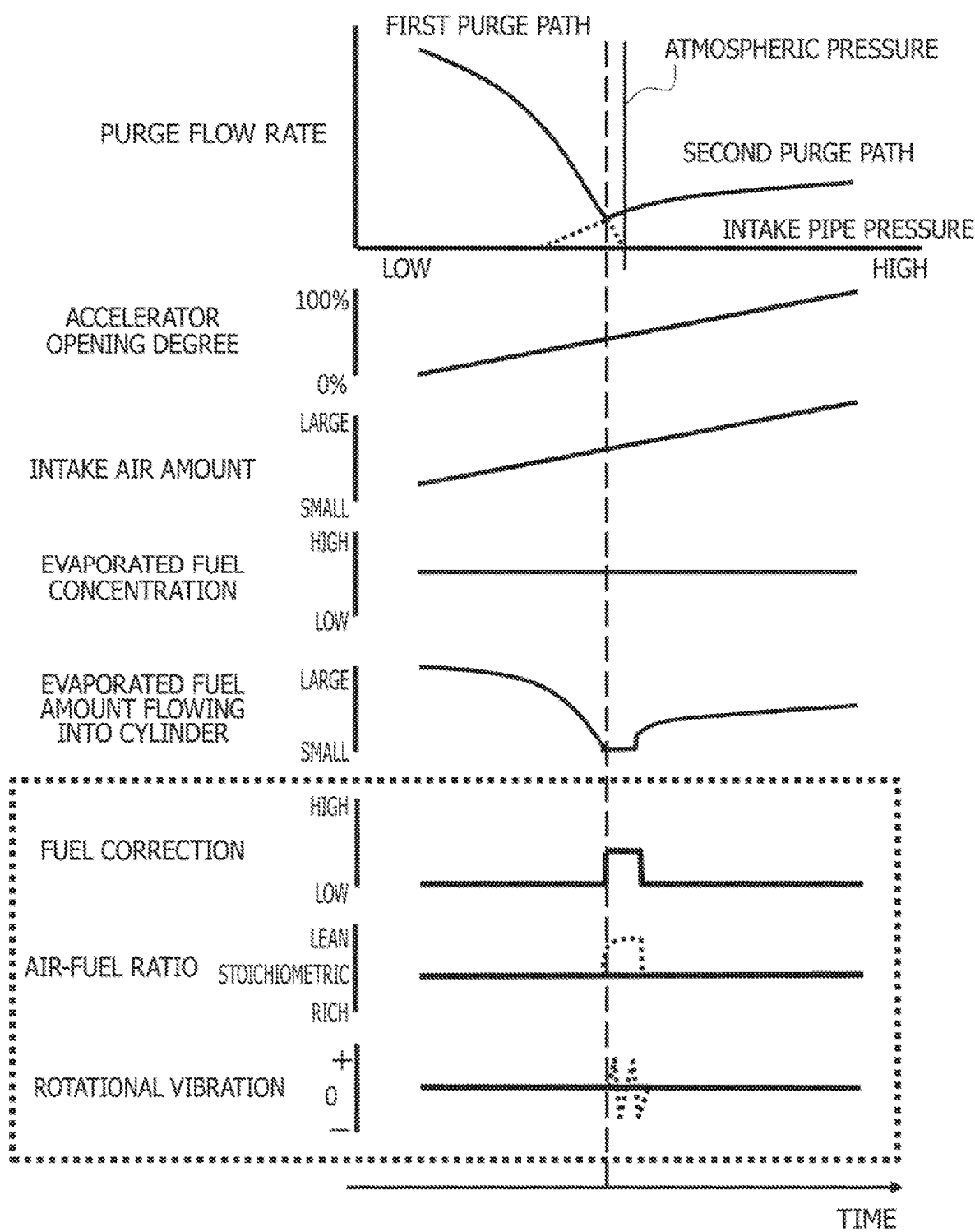
FIG. 6 is a timing diagram for explaining a fuel amount increasing correction for suppressing the change in air-fuel ratio that is caused when the purge paths are switched, according to the embodiment of the present invention.

The timing diagram of FIG. 6 illustrates the fuel correction amount, the air-fuel ratio, and the rotational vibrations, in a case in which electronic control unit 14 performs the increasing correction process of the fuel injection amount at the time of switching the purge paths.

Electronic control unit 14 corrects the fuel injection amount to increase it for a predetermined time, using the switching point of the purge paths as a reference point.

This increases the injection amount of fuel injection valve 19, when the inflow of the evaporated fuel into the cylinder temporarily interrupts. Thus, the increased amount of the fuel injection amount from fuel injection valve 19 offsets the decreased amount of the inflow of the evaporated fuel into the cylinder. Thus, the air-fuel ratio can be prevented from being leaner, and the rotational vibrations, which might be caused by the leaner air-fuel ratio, can be prevented.

In the fuel amount increasing correction, electronic control unit 14 may determine a timing for starting increasing the amount based on difference $\Delta NP$ between intake pipe pressure IP at the downstream of throttle valve 6 and pressure ENP generated by ejector 17, and may variably set the increase period and/or the increasing correction amount based on the rate of change in difference $\Delta NP$.

That is, electronic control unit 14 starts increasing the amount of fuel at the time when difference $\Delta NP$ becomes less than or equal to a threshold, in other words, when difference $\Delta NP$ reaches the switching point of the purge paths or approaches the switching point of the purge paths, and electronic control unit 14 sets a longer increase period as the rate of change in difference $\Delta NP$ decreases and sets the greater amount to be increased as the rate of change in difference $\Delta NP$ decreases.

When the rate of change in difference $\Delta NP$ is greater, the delay period until the evaporated fuel flows through switched first purge path 21 and flows into the cylinder of internal combustion engine 1 is short, so that the air fuel ratio is prevented from being leaner. Thus, electronic control unit 14 sets a shorter increase period and a smaller amount to be increased than those set in a case in which the rate of change in difference $\Delta NP$ is slow, to prevent the excessive increase in fuel amount.

Thus, since electronic control unit 14 variably sets the increase period and/or the increasing correction amount, which is the amount to be increased, based on the rate of change in difference ΔNP, it is possible to prevent the fluctuation in air-fuel ratio which might occur at the time of switching the purge paths, in both cases in which the load of internal combustion engine 1 suddenly or gradually changes.

Electronic control unit 14 may be set so that electronic control unit 14 performs the fuel amount increasing process during acceleration of internal combustion engine 1, at which first purge path 21 is switched to second purge path 22, and does not perform the fuel amount increasing process during deceleration of internal combustion engine 1, at which second purge path 22 is switched to first purge path 21.

Figure 7:
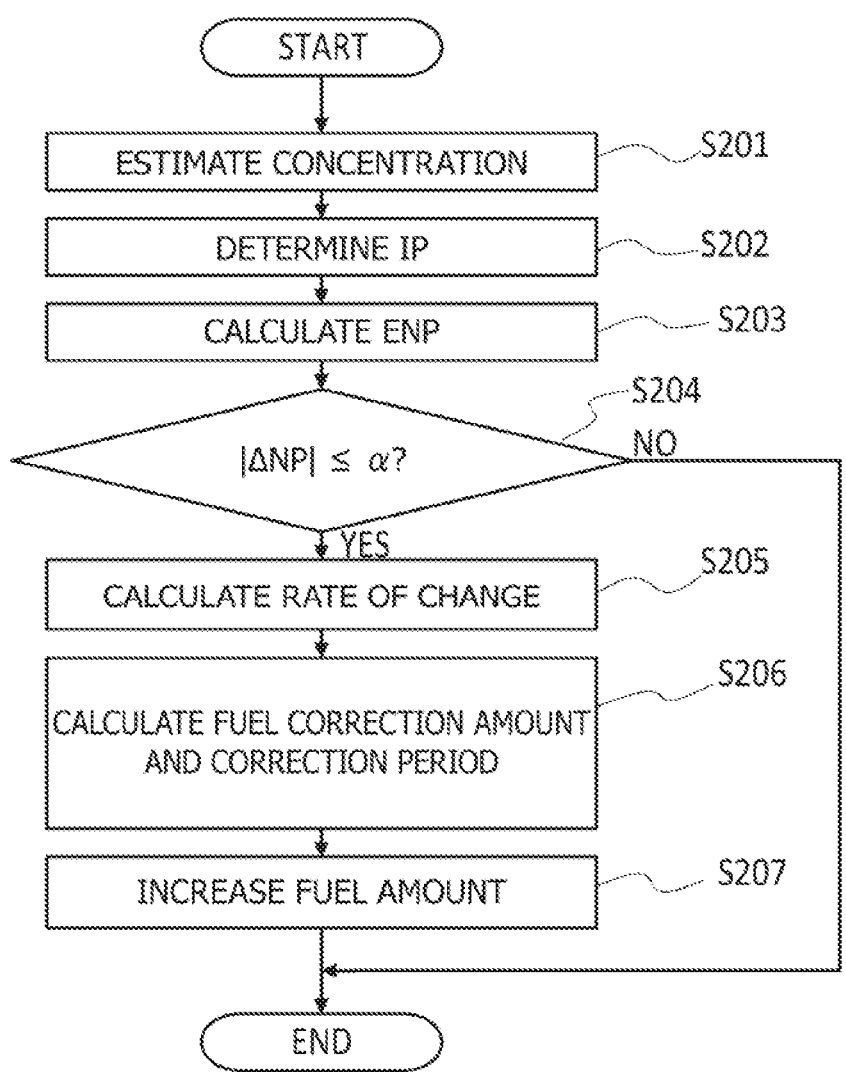
FIG. 7 is a flowchart showing the fuel amount increasing correction, which is performed when the purge paths are switched, according to the embodiment of the present invention.

The flowchart of FIG. 7 shows the fuel amount increasing process performed by electronic control unit 14 when the purge paths are switched.

In step S201, electronic control unit 14 estimates the evaporated fuel concentration based on the purge ratio and the air-fuel ratio correction factor AFHOS.

Next, in step S202, electronic control unit 14 calculates intake pipe pressure IP in intake pipe 4 at the downstream of throttle valve 6 based on the measurement signal of third pressure sensor 33.

In step S203, electronic control unit 14 calculates pressure ENP generated by ejector 17, based on a difference between pressure UCP in intake pipe 4 at the upstream of compressor 2*a* and pressure DCP in intake pipe 4 at the downstream of compressor 2*a*.

Then, in step S204, electronic control unit 14 determines whether the absolute value of difference ΔNP between intake pipe pressure IP and pressure ENP generated by ejector 17 is less than or equal to predetermined value α.

For example, in a state in which the purge is performed through first purge path 21, electronic control unit 14 determines in step S204 whether intake pipe pressure IP increases toward the atmospheric pressure and approaches pressure ENP generated by ejector 17, to determine whether a condition for switching from first purge path 21 to second purge path 22 is satisfied.

When the absolute value of difference ΔNP between intake pipe pressure IP and pressure ENP generated by ejector 17 becomes less than or equal to predetermined value α, in other words, when the absolute value of difference ΔNP approaches the switching point at which intake pipe pressure IP and pressure ENP generated by ejector 17 approximate, the process of electronic control unit 14 proceeds to step S205. Then, electronic control unit 14 obtains the amount of change in difference ΔNP between intake pipe pressure IP and pressure ENP generated by ejector 17 within a predetermined time, that is, the rate of change in difference ΔNP.

In the next step S206, electronic control unit 14 sets at least one of the amount to be increased and the increase period of the fuel injection amount, based on the estimated value of the evaporated fuel concentration and the rate of change in difference ΔNP.

The increase period is set so that a time point at which the absolute value of difference ΔNP between intake pipe pressure IP and pressure ENP generated by ejector 17 becomes less than or equal to predetermined value α, is set to be a timing for starting increasing the amount, and a time point to terminate the increasing correction is set based on a time, an integrated engine rotational speed or an integrated number of injection times.

Here, electronic control unit 14 can sets the greater amount to be increased and/or the longer increase period, as the estimated value of the evaporated fuel concentration increases, that is, as the air-fuel ratio becomes leaner due to the interruption of the inflow of the evaporated fuel.

Furthermore, since the period at which the inflow of the evaporated fuel interrupts increases when the rate of change in difference ΔNP is slow, electronic control unit 14 may set greater amount to be increased and/or longer increase period, as the rate of change in difference ΔNP decreases.

Electronic control unit 14 may set one of the amount to be increased and the increase period to be a fixed value, and may set the other to be variable, based on the estimated value of evaporated fuel concentration and the rate of change in difference ΔNP. Alternatively, electronic control unit 14 may set both of the amount to be increased and the increase period to be variable, based on the estimated value of evaporated fuel concentration and the rate of change in difference ΔNP.

Furthermore, electronic control unit 14 may variably set the amount to be increased based on the estimated value of evaporated fuel concentration, and may variably set the increase period based on the rate of change in difference ΔNP.

When electronic control unit 14 determines the amount to be increased and the increase period of the fuel injection amount, the process proceeds to step S207, in which a process for correcting the fuel injection amount of fuel injection valve 19 based on the amount to be increased, is made to continue for the increase period set after the absolute value of difference ΔNP between intake pipe pressure IP and pressure ENP generated by ejector 17 becomes less than or equal to predetermined value α.

Thus, even if the inflow of evaporated fuel into the cylinder is temporarily interrupted at the time of switching between first purge path 21 and second purge path 22, it is possible to prevent the air-fuel ratio of internal combustion engine 1 from being leaner, so that it is possible to prevent the rotational vibrations, which might be caused by the leaner air-fuel ratio.

In the evaporated fuel processing device 3 provided with first purge path 21 and second purge path 22, the suction force is weakened near the switching point in both cases of first and second purge paths 21 and 22, and thus, the evaporated fuel desorption amount from canister 8 decreases, resulting in a decrease in estimated value of the evaporated fuel concentration.

Then, if the purge is temporarily stopped for air-fuel ratio learning, etc., in such a state in which the estimated concentration has decreased near the switching point, the update on the estimated concentration is stopped and the lower value obtained immediately before the purge is stopped is maintained.

Here, if the purge paths are switched while the purge is stopped, and then the purge is restarted in a state in which the suction force generated by the switched purge path increases, purge control valve 12 is controlled based on the lower estimated concentration, which has been maintained; however, a greater amount of the evaporated fuel is actually desorbed, resulting in a greater actual concentration than the estimated value. This makes purge control valve 12 excessively open, resulting in a richer air-fuel ratio.

Figure 8:
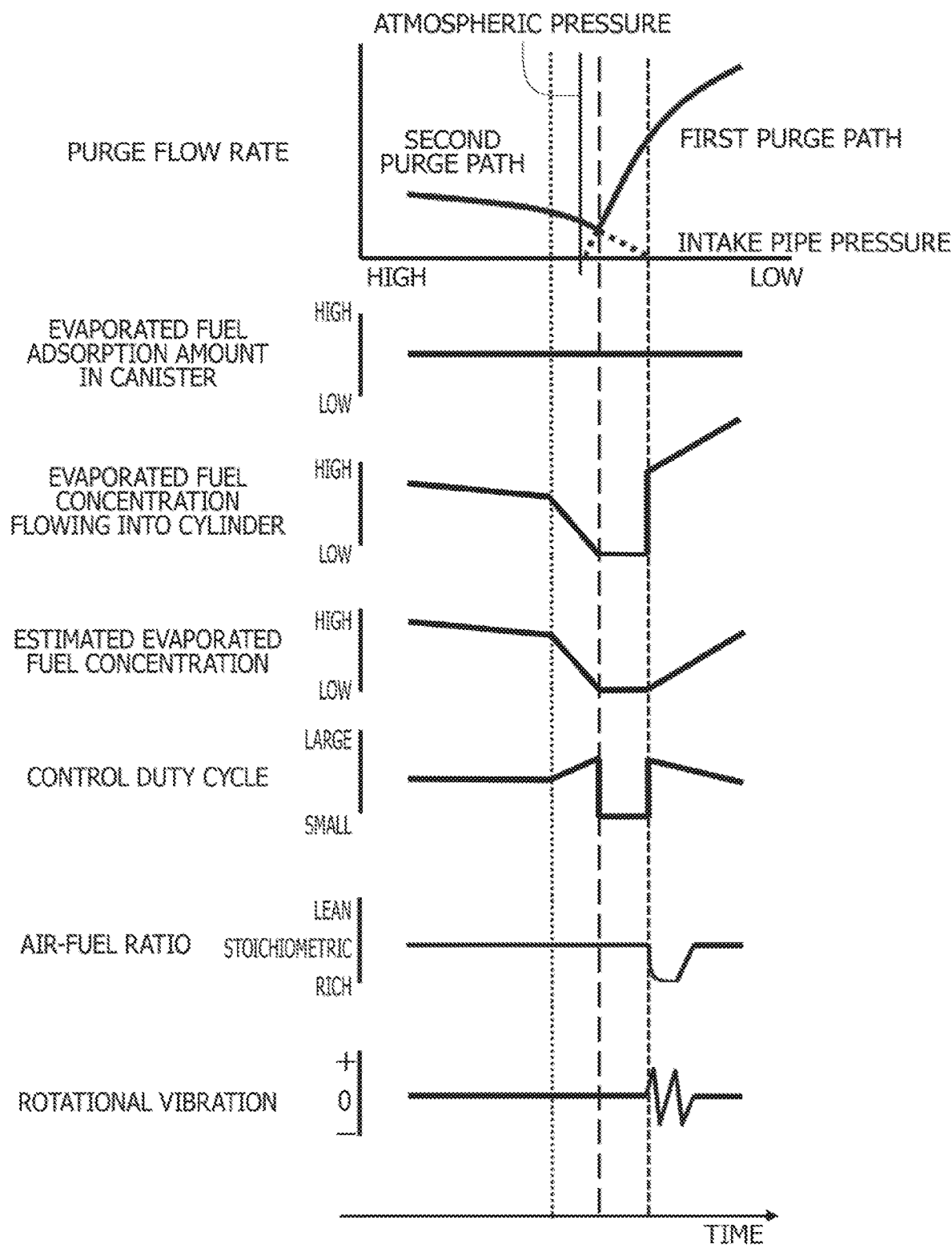
FIG. 8 is a timing diagram for explaining a change in estimated concentration that is caused when the purge paths are switched, according to the embodiment of the present invention.

FIG. 8 illustrates a change in air-fuel ratio that is caused when the purge is stopped in the condition in which the suction force near the switching point is the smallest, in the deceleration state of internal combustion engine 1 in which second purge path 22 is switched to first purge path 21, and the purge is then restarted in a state in which the purge is performed through first purge path 21.

In FIG. 8, if the load of internal combustion engine 1 decreases while the purge is performed through second purge path 22, the suction force generated by ejector 17 is weakened as the boost pressure is weakened, and thus, the amount of evaporated fuel desorbed from canister 8 decreases. As a result, the estimated value of the evaporated fuel concentration decreases, and the desorption amount decreases as it approaches the purge path switching point.

Thus, when the purge is stopped for air-fuel ratio learning, etc., near the switching point at which the desorption amount is the smallest, the estimated concentration obtained immediately before the stop is maintained, and then, the estimation of concentration is restarted with the maintained estimated concentration used as an initial value at the time of restarting the purge, and the drive duty cycle of purge control valve 12 is calculated based on the estimated concentration.

Here, at the time when the update on the estimated concentration is stopped, in other words, at the time when the purge is stopped, the evaporated fuel concentration is low because the suction force of the evaporated fuel is weak near the switching point. However, when the purge restarts, the purge is performed through first purge path 21 and the desorption amount of the evaporated fuel purged through first purge path 21 is greater than that desorbed when the purge is stopped, so that the estimated concentration maintained while the purge is stopped is lower than the actual concentration.

Electronic control unit 14 calculates the drive duty cycle of purge control valve 12 based on this estimated concentration, which is lower than the actual value. This excessively increases the evaporated fuel flowing into the cylinder, and enriches the air-fuel ratio. The enriched air-fuel ratio causes rotational vibrations.

Electronic control unit 14 corrects the estimated value of the evaporated fuel concentration to a higher value by determining the enrichment of air-fuel ratio due to the inflow of the evaporated fuel through first purge path 21 after the purge restarts, so as to reduce the opening degree of purge control valve 12 in response to the update of the estimated value, to make the air-fuel ratio approach again the target value.

Electronic control unit 14 limits the update of the estimated value of the evaporated fuel concentration near the switching point between first purge path 21 and second purge path 22, in order to reduce fluctuations in air-fuel ratio caused by the deviation between the estimated concentration and the actual concentration, as described above.

Figure 9:
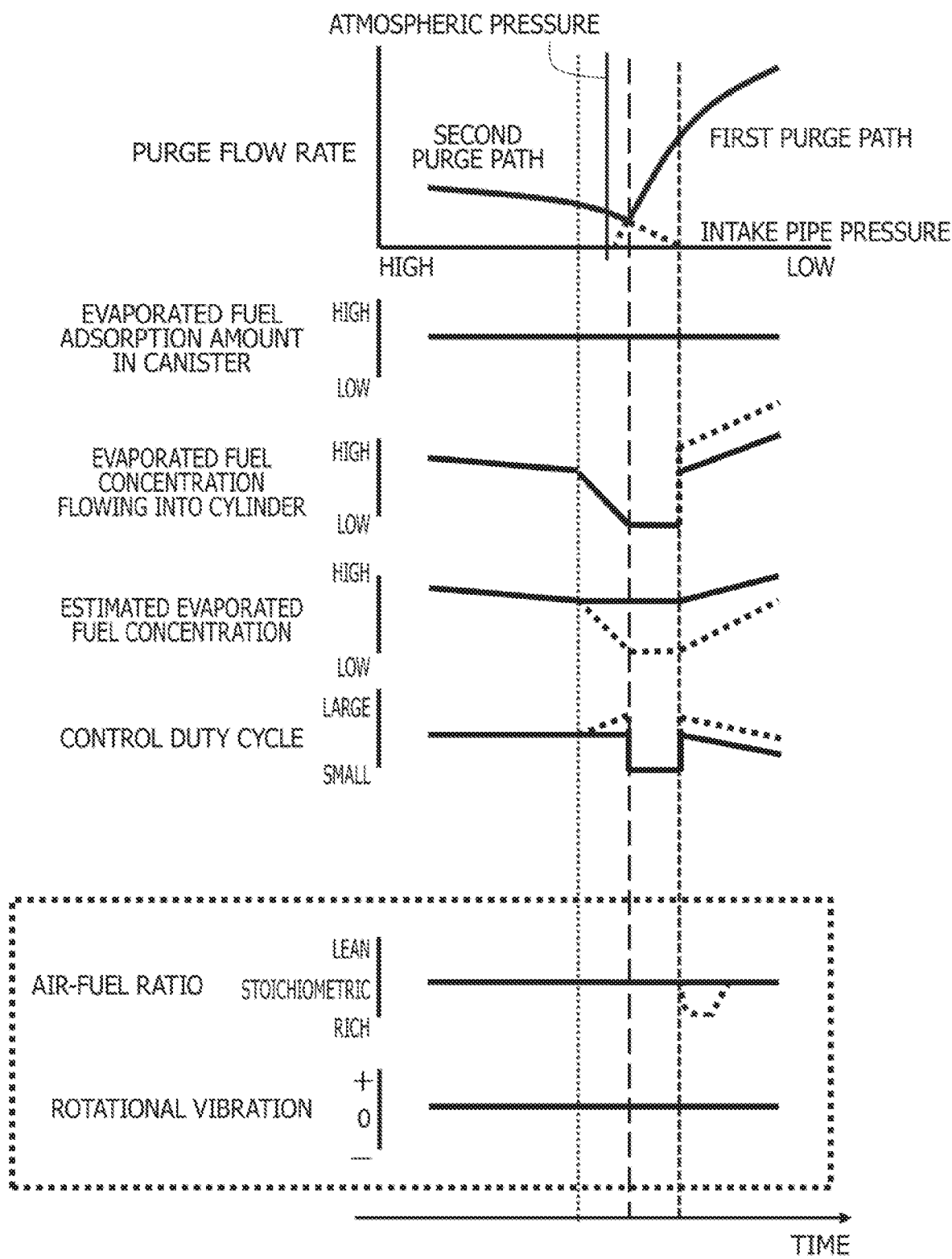
FIG. 9 is a timing diagram for explaining limitation of update on the estimated concentration, which is performed when the purge paths are switched, according to the embodiment of the present invention.

The timing diagram of FIG. 9 illustrates a change in estimated concentration, a change in air-fuel ratio, and a change in drive duty cycle of purge control valve 12, at the time when electronic control unit 14 limits, near the switching point of the purge paths, the update on estimated value of the evaporated fuel concentration for use in the purge control.

Electronic control unit 14 performs a process of stopping updating the estimated value of the evaporated fuel concentration for use in the purge control, in other words, a process of limiting the update on the estimated value of the evaporated fuel concentration, when difference $\Delta NP$ between intake pipe pressure IP and pressure ENP generated by ejector 17, which is out of a region in which the estimated value is maintained (hereinafter referred to as "maintaining region"), which region includes the switching point, falls within the maintaining region, and when a condition in which the desorption amount of the evaporated fuel from canister 8 falls below the set value is satisfied.

In the example in FIG. 9, when the load of internal combustion engine 1 decreases while the purge is performed through second purge path 22, and it approaches the switching point, the update on the estimated value of the evaporated fuel concentration is stopped, so that a previous value of the estimated concentration is maintained.

Thus, although the actual concentration decreases as difference $\Delta NP$ approaches the switching point, a value obtained immediately before difference $\Delta NP$ falls within the maintaining region is maintained as the estimated concentration.

Thus, even when the purge is stopped while the estimated concentration is maintained, it is possible to prevent the estimated concentration which is lower than at least the set value from being used as the initial value in the purge control at the time of restarting the purge, and thus, it is possible to prevent the enrichment of the air-fuel ratio, which might be caused by the estimated concentration lower than the actual concentration at the time of restarting the purge.

Figure 10:
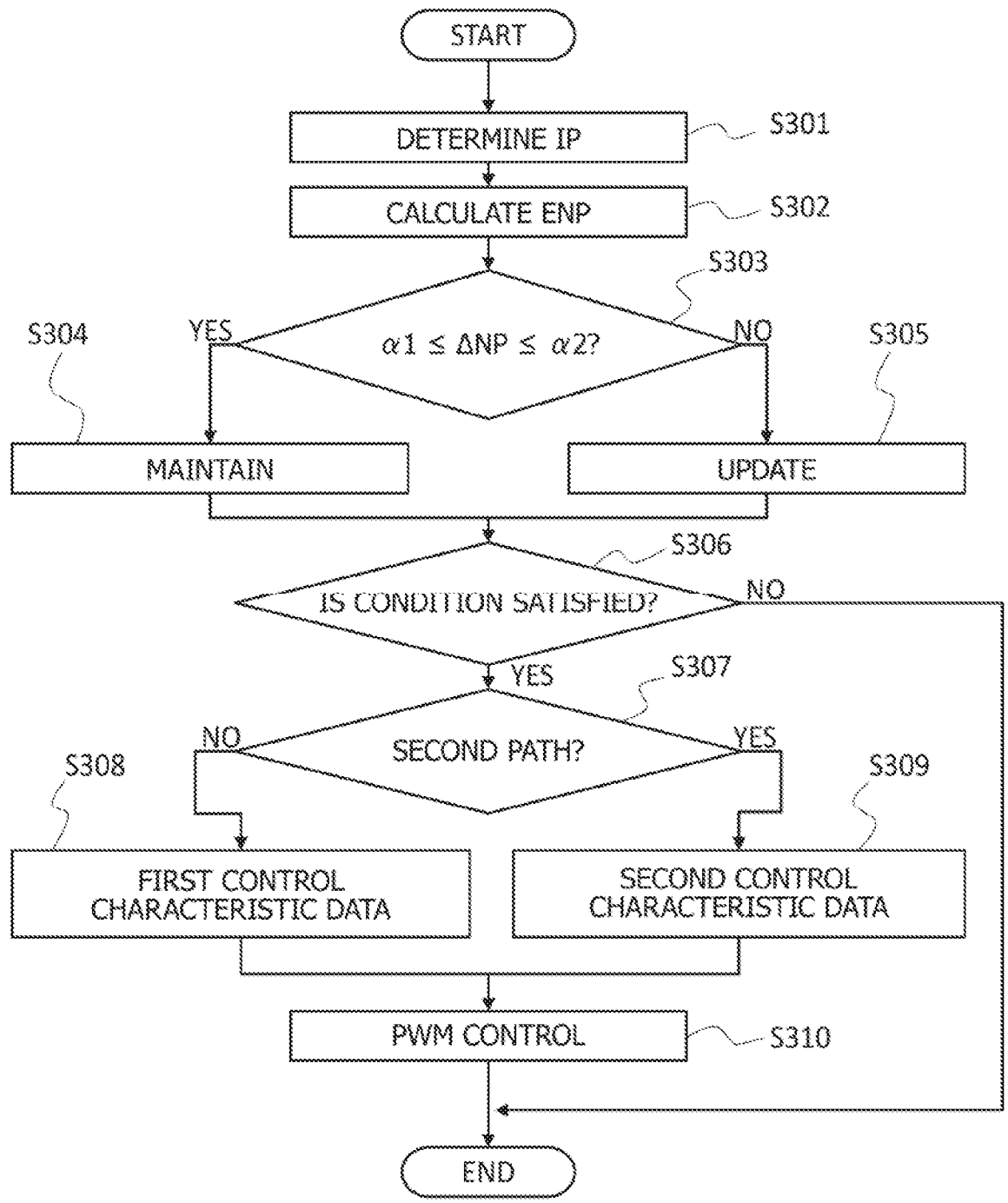
FIG. 10 is a flowchart showing a process of limiting update on the estimated concentration, which is performed when the purge paths are switched, according to the embodiment of the present invention.

The flowchart of FIG. 10 shows a process of limiting the update on the estimated concentration, which is performed by electronic control unit 14 when the purge paths are switched.

In step S301, electronic control unit 14 calculates intake pipe pressure IP based on the measurement signal of third pressure sensor 33.

Next, in step S302, electronic control unit 14 calculates pressure ENP generated by ejector 17, based on a difference between pressure UCP in intake pipe 4 at the upstream of compressor 2a and pressure DCP in intake pipe 4 at the downstream of compressor 2a.

Then, in step S303, electronic control unit 14 determines whether difference $\Delta NP$ between intake pipe pressure IP and pressure ENP generated by ejector 17 is greater than or equal to negative first predetermined value $\alpha 1$ and is less than or equal to a positive second predetermined value $\alpha 2$, that is, whether difference $\Delta NP$ is within the maintaining region of the estimated concentration defined by first predetermined value al and second predetermined value $\alpha 2$.

The maintaining region includes the switching point of the purge paths. The state in which difference $\Delta NP$ is within the maintaining region means that difference $\Delta NP$ is within a region around the switching point, and is within a region in which the suction force in both purge paths is the smallest, that is, the desorption amount of the evaporated fuel is the smallest.

Here, if difference $\Delta NP$ is out of the maintaining region, that is, if it departs from the switching point and the purge paths generate the suction force greater than or equal to the set value, the process proceeds to step S305, in which electronic control unit 14 obtains and updates the estimated value of the evaporated fuel concentration while the purge is performed, based on air-fuel ratio correction factor AFHOS and the purge ratio.

On the other hand, if difference $\Delta NP$ is within the maintaining region, the process proceeds to step S304, in which electronic control unit 14 maintains the previous estimated value of the evaporated fuel concentration without updating the estimated value.

Thus, when difference $\Delta NP$ in a state of being out of the maintaining region falls within the maintaining region, electronic control unit 14 maintains the estimated evaporated fuel concentration estimated immediately before difference $\Delta NP$ falls within the maintaining region, during a state in which difference $\Delta NP$ is within the maintaining region. Then, when difference $\Delta NP$ deviates from the maintaining region, electronic control unit 14 restarts updating the estimated value of the evaporated fuel concentration.

Next, in step S306, electronic control unit 14 determines whether a condition for permitting the purge is satisfied.

Electronic control unit 14 determines that the purge permission condition is not satisfied when there is a request for stopping the purge to perform air-fuel ratio learning, for example.

Then, if the purge permission condition is not satisfied because there is a request for stopping the purge to perform air-fuel ratio learning, for example, the routine is terminated, and thus, electronic control unit 14 maintains purge control valve 12 to be in a closed state.

As used herein, the closed state of purge control valve 12 is a state in which the drive duty cycle is 0% and power is not supplied.

On the other hand, if the purge permission condition is satisfied because there is no request for stopping the purge for air-fuel ratio learning, for example, the process proceeds to step S307, in which electronic control unit 14 compares intake pipe pressure IP and pressure ENP generated by ejector 17 to determine whether the purge is performed through first purge path 21 or through second purge path 22.

If electronic control unit 14 determines that the purge is performed through first purge path 21, the process proceeds to step S308, in which electronic control unit 14 selects first control characteristic data, which is stored for first purge path 21, as the control characteristic data for use in the control of purge control valve 12.

On the other hand, if electronic control unit 14 determines that the purge is performed through second purge path 22, the process proceeds to step S309, in which electronic control unit 14 selects second control characteristic date, which is stored for second purge path 22, as the control characteristic data for use in the control of purge control valve 12.

The contents of the processes in the steps S308 and S309 are similar to those of the steps S104 and S105, described above, and detailed explanation is omitted.

After selecting the control characteristic data in step S308 or step S309, the process proceeds to step S310, in which electronic control unit 14 calculates the drive duty cycle of purge control valve 12 using the selected control characteristic data selected based on the purge path, and performs the PWM control of purge control valve 12 with the calculated drive duty cycle.

Thus, since electronic control unit 14 maintains the estimated value of the evaporated fuel concentration in the maintaining region around the switching point, it is possible to prevent the decrease in estimated concentration, which might be caused by following the decrease in desorption amount caused because the suction force generated by the purge path is weakened near the switching point.

Thus, even if the purge is temporarily stopped while difference ΔNP is within the maintaining region and then the purge is restarted after the suction power increases, it is possible to reduce the difference between the actual concentration and the estimated value at the time of restarting the purge, and thus, it is possible to prevent the air-fuel ratio from being richer at the time of restarting the purge.

The technical concepts described in the above embodiment may be used in combination as necessary, as long as no conflict arises.

Although the present invention is described in detail with reference to the preferred embodiment, it is apparent that one skilled in the art may make various modifications based on the fundamental technical concepts and teachings of the present invention.

For example, the switching process of control characteristic data of purge control valve 12 based on which of first purge path 21 and second purge path 22 is used for purging the evaporated fuel, may be modified by adopting a process of correcting a reference control characteristic data based on the purge path.

The process of limiting the update on the estimated value of the evaporated fuel concentration at the time of switching between first purge path 21 and second purge path 22 may be modified by not only adopting a process of stopping the update, but also adopting a process of using a moving average value of the estimated concentration or a process of limiting a deviation of the latest value with respect to the previous value to be a set value or less.

A differential pressure sensor may be provided to measure a differential pressure between pressure UCP in intake pipe 4 at the upstream of compressor 2a and pressure DCP in intake pipe 4 at the downstream of compressor 2a, and electronic control unit 14 may obtain pressure ENP generated by ejector 17 based on the measurement value of the differential pressure sensor. A pressure sensor that directly measures pressure ENP generated by ejector 17 may be provided.

First purge path 21 for performing the purge into intake pipe 4 at the downstream of throttle valve 6 and second purge path 22 for performing the purge into intake pipe 4 at the upstream of compressor 2a by pressure ENP generated by ejector 17 may be independently provided, and an electronically controlled purge control valve may be provided in each purge path.

REFERENCE SYMBOL LIST

1 Internal combustion engine
2 Turbocharger (forced induction device)
2a Compressor
3 Evaporated fuel processing device
4 Intake pipe
6 Throttle valve
7 Fuel tank
8 Canister
12 Purge control valve
14 Electronic control unit (control unit)
17 Ejector
21 First purge path
22 Second purge path

The invention claimed is:
1. An evaporated fuel processing device for a forced induction internal combustion engine including a compressor of a forced induction device and a throttle valve in an intake pipe,
the evaporated fuel processing device comprising:
a canister that adsorbs an evaporated fuel generated in a fuel tank;
a purge control valve that adjusts a purge flow rate from the canister;
a first purge path extending from a downstream of the purge control valve to the intake pipe at a downstream of the throttle valve;
a second purge path extending from the downstream of the purge control valve to an ejector, the ejector being provided in a reflux pipe providing communication between the intake pipe at a downstream of the compressor and the intake pipe at an upstream of the compressor; and a control unit that controls the purge control valve based on control characteristic data, wherein the control unit comprises a memory for storing first control characteristic data for the first purge path and second control characteristic data for the second purge path, and switches the control characteristic data between first control characteristic data for the first purge path and second control characteristic data for the second purge path, upon determining that the first purge path and the second purge path are switched, wherein the control unit increases a fuel injection amount injected to the internal combustion engine, when the first purge path and the second purge path are switched, and wherein the control unit changes at least one of an amount to be increased and an increase period of the fuel injection amount, based on a rate of change in a difference between the intake pipe pressure at the downstream of the throttle valve and the pressure generated by the ejector.

* * * * *